US011706383B1

(12) United States Patent
Eble et al.

(10) Patent No.: US 11,706,383 B1
(45) Date of Patent: Jul. 18, 2023

(54) PRESENTING VIDEO STREAMS ON A HEAD-MOUNTABLE DEVICE

(71) Applicant: Apple Inc., Cupertino, CA (US)

(72) Inventors: Tobias Eble, Sunnyvale, CA (US); Sabine Webel, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 96 days.

(21) Appl. No.: 16/015,803

(22) Filed: Jun. 22, 2018

Related U.S. Application Data

(60) Provisional application No. 62/564,844, filed on Sep. 28, 2017.

(51) Int. Cl.
*H04N 7/01* (2006.01)
*H04N 5/46* (2006.01)
(Continued)

(52) U.S. Cl.
CPC ......... *H04N 7/0127* (2013.01); *G06F 3/1446* (2013.01); *H04N 5/46* (2013.01); *H04N 21/44* (2013.01); *G01S 7/068* (2013.01); *G06F 1/3265* (2013.01); *G06F 3/011* (2013.01); *G09G 3/003* (2013.01); *G09G 2330/021* (2013.01); *G09G 2340/0435* (2013.01); *H04N 13/139* (2018.05); *H04N 13/161* (2018.05); *H04N 13/194* (2018.05); *H04N 13/20* (2018.05); *H04N 13/341* (2018.05); *H04N 13/344* (2018.05)

(58) Field of Classification Search
CPC ........ H04N 7/0127; H04N 21/44; H04N 5/46; H04N 5/45; H04N 13/344; H04N 13/20; H04N 13/341; H04N 13/296; H04N 13/385; H04N 2213/006; H04N 13/139; H04N 13/161; H04N 13/194; G06F 3/1446; G06F 1/3265; G06F 16/786; G06F 3/011; G06K 9/00711; G06K 9/00671; G09G 2320/10; G09G 2310/04; G09G 2330/021; G09G 2340/0435; G09G 3/003; G02B 27/017; G01S 7/298; G01S 7/068; H04M 2203/359
See application file for complete search history.

(56) References Cited

U.S. PATENT DOCUMENTS 10,404,963 B1 * 9/2019 Kenrick ............... H04N 13/189
2011/0018881 A1 * 1/2011 Nash ....................... G06T 13/00
345/473

(Continued)

*Primary Examiner* — Douglas M Wilson
(74) *Attorney, Agent, or Firm* — Fernando & Partners, LLP (57) ABSTRACT

In various implementations, a method of presenting video streams at a head-mountable device (HMD) includes generating a first video stream at a first frame rate for a first display portion. In some implementations, the first frame rate indicates a rate at which frames are presented by the first display portion. In various implementations, the method includes generating a second video stream at a second frame rate for a second display portion. In some implementations, the second frame rate indicates a rate at which frames are presented by the second display portion. In some implementations, the second frame rate is within a threshold relative to the first frame rate. In various implementations, the method includes temporally shifting the second video stream relative to the first video stream so that a majority of refresh times of the first display portion are different from refresh times of the second display portion.

23 Claims, 7 Drawing Sheets

(51) Int. Cl.
  *G06F 3/14*      (2006.01)
  *H04N 13/20*     (2018.01)
  *H04N 13/344*    (2018.01)
  *G01S 7/06*      (2006.01)
  *G06F 1/3234*    (2019.01)
  *H04N 13/139*    (2018.01)
  *H04N 13/194*    (2018.01)
  *H04N 21/44*     (2011.01)
  H04N 13/341          (2018.01)
  G06F 3/01            (2006.01)
  G09G 3/00            (2006.01)
  H04N 13/161          (2018.01)

(56) References Cited

U.S. PATENT DOCUMENTS

| | | | | |
|---|---|---|---|---|
| 2011/0175865 | A1* | 7/2011 | Bae | G09G 3/3648 |
| | | | | 345/204 |
| 2012/0154411 | A1* | 6/2012 | Cheng | G06T 1/20 |
| | | | | 345/506 |
| 2013/0208189 | A1* | 8/2013 | White | H04N 5/14 |
| | | | | 348/607 |
| 2013/0257752 | A1* | 10/2013 | Tripathi | G09G 3/20 |
| | | | | 345/545 |
| 2015/0172622 | A1* | 6/2015 | Yoon | H04N 13/122 |
| | | | | 345/694 |
| 2015/0373293 | A1* | 12/2015 | Vance | H04N 21/426 |
| | | | | 348/143 |

\* cited by examiner

PRESENTING VIDEO STREAMS ON A HEAD-MOUNTABLE DEVICE

CROSS-REFERENCE TO RELATED APPLICATIONS

This application claims priority to U.S. Provisional Patent App. No. 62/564,844, filed on Sep. 28, 2017, which is hereby incorporated by reference in its entirety.

TECHNICAL FIELD

The present disclosure generally relates to presenting video streams on a head-mountable device.

BACKGROUND

A head-mountable device is a display device that is worn on or around the head of a user. Head-mountable devices are available in a variety of different form factors. For example, some head-mountable devices resemble a helmet, whereas other head-mountable devices resemble a pair of eyeglasses. Most head-mountable devices include at least one display that the user can view when the head-mountable device is worn by the user. Some head-mountable devices include multiple displays. For example, some head-mountable devices include two displays, one for each eye. Head-mountable devices have a variety of applications. For example, head-mountable devices are often used in gaming, aviation, engineering and medicine.

Since a head-mountable device is in such close proximity to the user when the head-mountable device is being used, the amount of heat that the head-mountable device generates may need to be controlled. The amount of heat that the head-mountable device generates typically correlates to the amount of power consumed by the head-mountable device. As such, the amount of power that the head-mountable device consumes may need to be controlled. Typically, the amount of power consumed by a head-mountable device depends on the hardware and/or software capabilities of the head-mountable device. For example, a head-mountable device with higher processing power, a larger memory and/or a faster refresh rate typically consumes more power than a head-mountable device with lower processing power, a smaller memory and/or a slower refresh rate. However, limiting the hardware and/or software capabilities of the head-mountable device usually hampers performance of the head-mountable device and degrades the user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting a video stream on a head-mountable device (HMD). In various implementations, the HMD includes a first display portion, a second display portion, a receiver, a non-transitory memory, and one or more processors coupled with the first display portion, the second display portion, the receiver and the non-transitory memory. In some implementations, the method includes generating a first video stream at a first frame rate for the first display portion. In some implementations, the first frame rate indicates a rate at which frames are presented by the first display portion. In various implementations, the method includes generating a second video stream at a second frame rate for the second display portion. In some implementations, the second frame rate indicates a rate at which frames are presented by the second display portion. In some implementations, the second frame rate is within a threshold relative to the first frame rate. In various implementations, the method includes temporally shifting the second video stream relative to the first video stream so that a majority of refresh times of the first display portion are different from refresh times of the second display portion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a head-mountable device (HMD) includes a first display portion (e.g., a first display) and a second display portion (e.g., a second display). In some implementations, refresh rates for the first display portion and the second display portion are constrained. For example, in some implementations, the refresh rates are limited to a particular value in order to conserve power and/or reduce a thermal footprint of the HMD. In some implementations, utilizing relatively low refresh rates hampers performance of the HMD and/or degrades the user experience. For example, some applications (e.g., games, training simulations, etc.) appear sluggish and/or distorted at relatively low refresh rates.

In various implementations, the HMD generates a first video stream for the first display portion, and a second video stream for the second display portion. In some implementations, the first and second video streams are generated at respective frame rates that indicate corresponding rates at which frames are presented by the first and second display portions. In various implementations, the HMD temporally shifts the first and second video streams so that refresh times of the first display portion are different from refresh times of the second display portion. In some implementations, temporally shifting the video streams for the first display portion and the second display portion amounts to alternating the presentation of frames between the first display portion and the second display portion. In some implementations, temporally shifting the video streams produces a psycho-optic effect resulting in a perceived frame rate that is greater than the frame rates at which the first and second video streams are generated. In some implementations, temporally shifting the video streams allows the HMD to maintain a particular frame rate for the first and second display portions while displaying frames for applications that are better suited for displays with higher frame rates. As such, in some implementations, temporally shifting the video streams allows the HMD to reduce power consumption and/or reduce the thermal footprint of the HMD.

Figure 1:
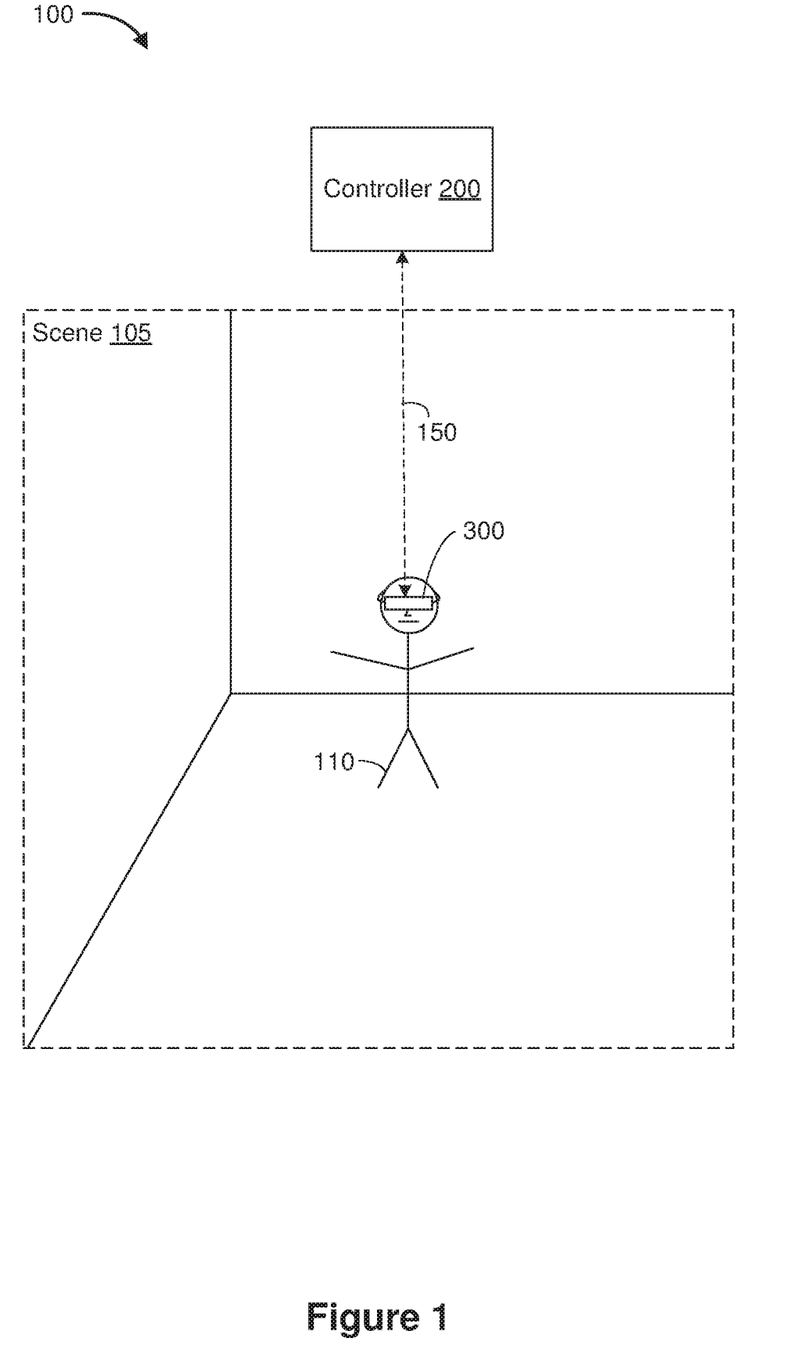
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 200 and a head-mountable device (HMD) 300. In the example of FIG. 1, the HMD 300 is located at a scene 105 (e.g., a particular geographical location such as a meeting room). As illustrated in FIG. 1, the HMD 300 can be worn by a user 110.

In some implementations, the controller 200 is configured to manage and coordinate an augmented reality/virtual reality (AR/VR) experience for the user 110. In some implementations, the controller 200 includes a suitable combination of software, firmware, and/or hardware. The controller 200 is described in greater detail below with respect to FIG. 2. In some implementations, the controller 200 is a computing device that is local or remote relative to the scene 105. In some implementations, the controller 200 resides at a server. For example, in some implementations, the controller 200 resides at a local server located within the scene 105. For example, in some implementations, the controller 200 resides at a remote server located outside of the scene 105 (e.g., a cloud server, central server, etc.). In some implementations, the controller 200 resides at a smartphone, a tablet, a personal computer, a laptop computer, or the like.

In some implementations, the controller 200 is communicatively coupled with the HMD 300 via one or more wired and/or wireless communication channels 150 (e.g., BLUETOOTH, IEEE 802.11x, IEEE 802.16x, IEEE 802.3x, etc.). In some implementations, the controller 200 is communicatively coupled with a calibration device (not shown) via one or more wired and/or wireless communication channels (e.g., BLUETOOTH, IEEE 802.11x, IEEE 802.16x, IEEE 802.3x, etc.). In some implementations, the HMD 300 is communicatively coupled with the calibration device via one or more wired and/or wireless communication channels (e.g., BLUETOOTH, IEEE 802.11x, IEEE 802.16x, IEEE 802.3x, etc.). In some implementations, the calibration device enables calibration of the controller 200 and/or the HMD 300. In some implementations, the calibration device includes a smartphone, a tablet, a personal computer, a laptop computer, or the like.

In some implementations, the HMD 300 is configured to present the AR/VR experience to the user 110. In some implementations, the HMD 300 includes a suitable combination of software, firmware, and/or hardware. The HMD 300 is described in greater detail below with respect to FIG. 3. In some implementations, the functionalities of the controller 200 are provided by and/or combined with the HMD 300.

According to some implementations, the HMD 300 presents an augmented reality/virtual reality (AR/VR) experience to the user 110 while the user 110 is virtually and/or physically present within the scene 105. In some implementations, while presenting an augmented reality (AR) experience, the HMD 300 is configured to present AR content and to enable optical see-through of the scene 105. In some implementations, while presenting a virtual reality (VR) experience, the HMD 300 is configured to present VR content.

In some implementations, the user 110 mounts the HMD 300 onto his/her head. For example, in some implementations, the HMD 300 includes a frame that the user 110 positions on his/her nose and ears. In some implementations, the HMD 300 includes a strap that the user 110 wears around his/her forehead or chin. In some implementations, the HMD 300 is attachable to or integrated into a helmet that the user 110 wears on his/her head. In some implementations, the HMD 300 is attachable to or integrated into a pair of eyeglasses that the user 110 wears. In various implementations, the HMD 300 includes one or more AR/VR displays provided to display the AR/VR content. For example, in some implementations, the HMD 300 includes a first AR/VR display portion (e.g., a first AR/VR display, for example, a left AR/VR display) for one of the eyes of the user 110, and a second AR/VR display portion (e.g., a second AR/VR display, for example, a right AR/VR display) for the other eye of the user 110. In some implementations, the AR/VR displays partially or completely overlap with a field-of-view of the user 110. In some implementations, the HMD 300 is integrated into an AR/VR chamber, enclosure, or room that presents AR/VR content. In such implementations, the user 110 receives the AR/VR experience by being in the AR/VR chamber, enclosure, or room (e.g., instead of wearing the HMD 300).

In various implementations, the HMD 300 generates a first video stream for the first AR/VR display portion, and a second video stream for the second AR/VR display portion. In various implementations, the HMD 300 temporally shifts the first and second video streams so that refresh times of the first AR/VR display portion are different from refresh times of the second AR/VR display portion. In some implementations, temporally shifting the video streams for the first and second AR/VR display portions amounts to alternating the presentation of frames between the first and second AR/VR display portions. In some implementations, temporally shifting the video streams produces a psycho-optic effect resulting in a perceived frame rate that is greater than frame rates at which the first and second video streams are generated. In some implementations, temporally shifting the video streams allows the HMD 300 to maintain a particular frame rate for the first and second AR/VR display portions while displaying frames for applications that are better suited for displays with higher frame rates. As such, in some implementations, temporally shifting the video streams allows the HMD 300 to reduce power consumption and/or reduce the thermal footprint of the HMD 300.

Figure 2:
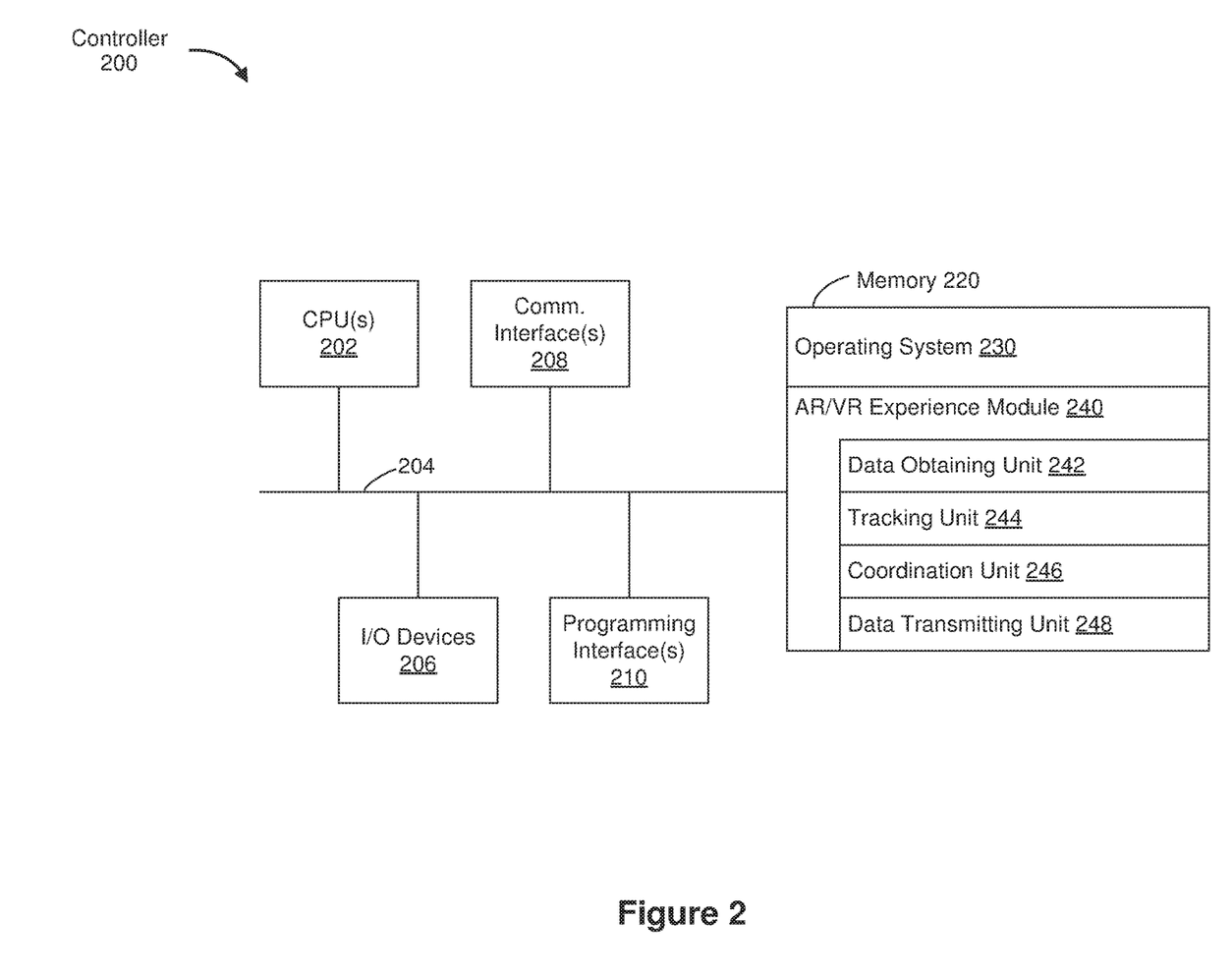
FIG. 2 is a block diagram of an example controller in accordance with some implementations.

FIG. 2 is a block diagram of an example of the controller 200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 200 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, a touch-sensitive display, and/or the like.

The memory 220 includes high-speed random-access memory, such as dynamic random-access memory (DRAM), static random-access memory (SRAM), double-data-rate random-access memory (DDR RAM), and/or other random-access solid-state memory devices. In some implementations, the memory 220 includes non-volatile memory, such as one or more magnetic disk storage devices, optical disk storage devices, flash memory devices, and/or other non-volatile solid-state storage devices. In some implementations, the memory 220 includes one or more storage devices remotely located from the one or more processing units 202. In some implementations, the memory 220 includes a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 manages and coordinates one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 obtains data (e.g., presentation data, interaction data, sensor data, location data, etc.) from at least one of the HMD 300 and the calibration device. To that end, in various implementations, the data obtaining unit 242 includes instructions and/or logic therefor, and heuristics and metadata therefor.

In some implementations, the tracking unit 244 maps the scene 105 and tracks the position/location of at least one of the HMD 300 and the calibration device with respect to the scene 105. To that end, in various implementations, the tracking unit 244 includes instructions and/or logic therefor, and heuristics and metadata therefor.

In some implementations, the coordination unit 246 manages and/or coordinates the AR/VR experience presented by the HMD 300. To that end, in various implementations, the coordination unit 246 includes instructions and/or logic therefor, and heuristics and metadata therefor.

In some implementations, the data transmitting unit 248 transmits data (e.g., presentation data, location data, etc.) to at least one of the HMD 300 and the calibration device. To that end, in various implementations, the data transmitting unit 248 includes instructions and/or logic therefor, and heuristics and metadata therefor.

In the example of FIG. 2, the data obtaining unit 242, the tracking unit 244, the coordination unit 246, and the data transmitting unit 248 are shown as residing on a single device (e.g., the controller 200). A person of ordinary skill in the art will appreciate that, in some implementations, the data obtaining unit 242, the tracking unit 244, the coordination unit 246, and the data transmitting unit 248 are included within separate computing devices.

As recognized by those of ordinary skill in the art, items shown separately could be combined and some items could be separated. For example, some modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
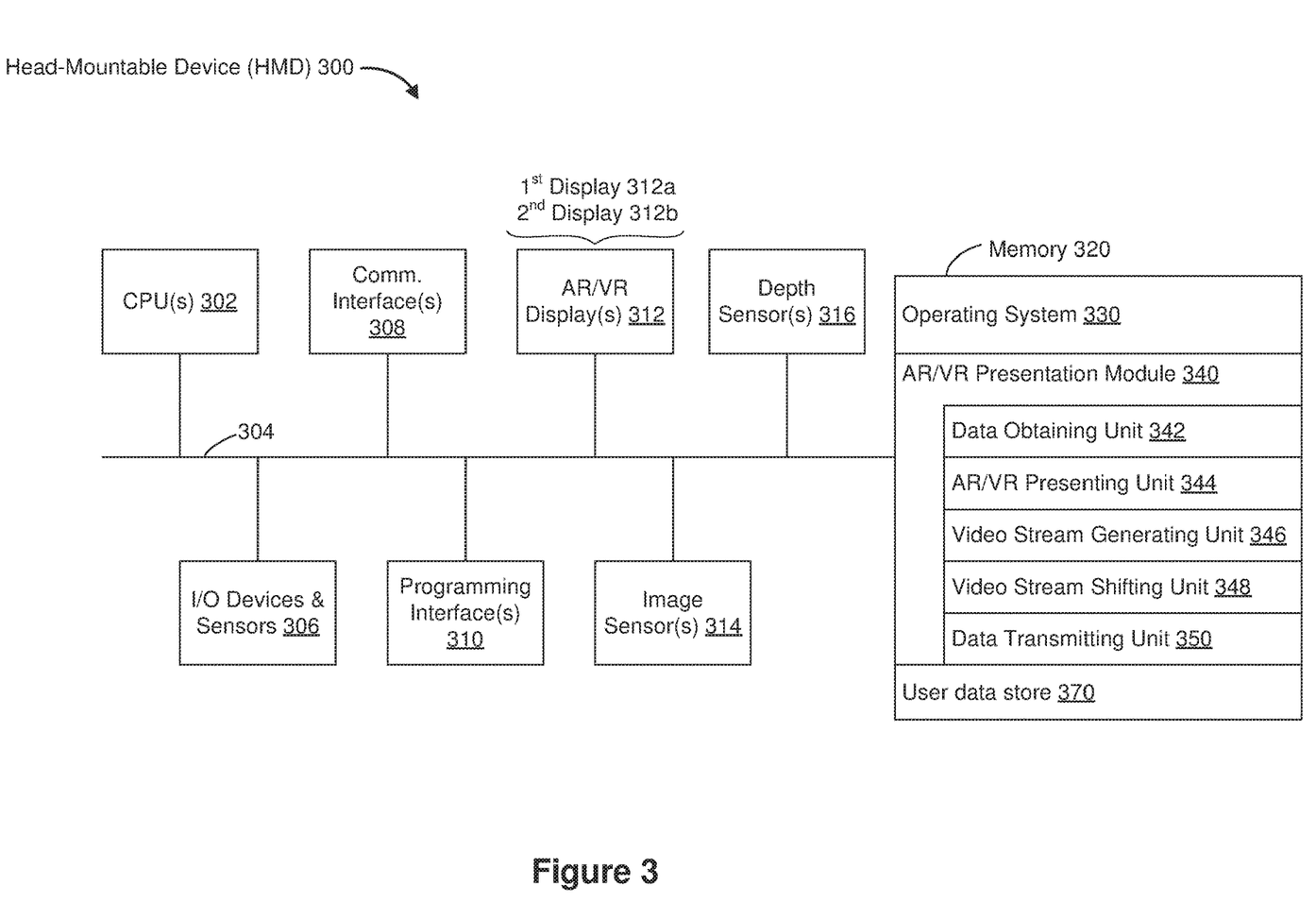
FIG. 3 is a block diagram of an example head-mountable device (HMD) in accordance with some implementations.

FIG. 3 is a block diagram of an example of a head-mountable device (HMD) 300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like), one or more programming (e.g., I/O) interfaces 310, one or more AR/VR displays 312, one or more optional interior and/or exterior facing image sensors 314, one or more optional depth sensors 316, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more AR/VR displays 312 present the AR/VR experience to the user. In some implementations, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 312 correspond to diffractive, reflective, polarized, holographic, waveguide displays, etc.

In some implementations, the one or more AR/VR displays 312 include a first display 312a and a second display 312b. In some implementations, the first display 312a and the second display 312b correspond to different portions of a single AR/VR display. In some implementations, the first display 312a corresponds to a left display for a left eye of the user 110, and the second display 312b corresponds to a right display for a right eye of the user 110. In some implementations, the one or more AR/VR displays 312 are capable of presenting AR and/or VR content.

In some implementations, the one or more optional image sensors 314 are configured to obtain image data that corresponds to at least a portion of the face of the user 110 that includes the eyes of the user 110. For example, the one or more optional image sensors 314 correspond to one or more of an RGB camera (e.g., with a complimentary metal-oxide-semiconductor (CMOS) image sensor or a charge-coupled device (CCD) image sensor), an IR camera, an event-based camera, and/or the like.

In some implementations, the one or more optional depth sensors 316 are configured to obtain depth data that corresponds to at least a portion of the face of the user 110 and to synthesize a depth/mesh map of the face of the user 110, where the mesh map characterizes the facial topography of the user 110. For example, the one or more optional depth sensors 316 correspond to a structured light device, a time-of-flight device, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an AR/VR presentation module 340, and a user data store 370.

In some implementations, the user data store 370 stores one or more user profiles. In some implementations, a user profile includes personal, demographic and/or biometric information for a respective user. For example, the user data store 370 includes a respective user profile that includes a name, a date of birth, a mobile phone number, a work phone number, a home phone number, a personal email address, a work email address, an average resting heartbeat, a head circumference, and/or the like.

The operating system 330 includes procedures for handling various basic system services and for performing hardware dependent tasks. In some implementations, the AR/VR presentation module 340 presents AR/VR content to the user 110 via the one or more AR/VR displays 312. To that end, in various implementations, the AR/VR presentation module 340 includes a data obtaining unit 342, an AR/VR presenting unit 344, a video stream generating unit 346, a video stream shifting unit 348, and a data transmitting unit 350.

In some implementations, the data obtaining unit 342 obtains data (e.g., video data, presentation data, interaction data, sensor data, location data, etc.). For example, in some implementations, the data obtaining unit 342 receives data from at least one of the controller 200 and the calibration device. In some implementations, the data obtaining unit 342 obtains video data. For example, in some implementations, the data obtaining unit 342 receives video frames from the controller 200. In some implementations, the data obtaining unit 342 obtains data that is already stored in the memory 320 (e.g., by retrieving the stored data from the memory 320). To that end, in various implementations, the data obtaining unit 342 includes instructions and/or logic therefor, and heuristics and metadata therefor.

In some implementations, the AR/VR presenting unit 344 presents AR/VR content via the one or more AR/VR displays 312. In some implementations, the AR/VR presenting unit 344 renders frames on the AR/VR display(s) 312. For example, in some implementations, the AR/VR presenting unit 344 utilizes the data (e.g., video data) obtained by the data obtaining unit 342 to present video frames on the AR/VR display(s) 312. To that end, in various implementations, the AR/VR presenting unit 344 includes instructions and/or logic therefor, and heuristics and metadata therefor.

In some implementations, the video stream generating unit 346 generates video streams. In some implementations, the video stream generating unit 346 synthesizes a video stream based on video data obtained by the data obtaining unit 342. In some implementations, the video stream generating unit 346 receives a video stream via the data obtaining unit 342. In some implementations, the video stream generating unit 346 generates a video stream for each display (e.g., for each display portion). For example, the video stream generating unit 346 generates a first video stream for the first display 312a, and a second video stream for the second display 312b. In some implementations, the video stream generating unit 346 generates multiple video streams by splitting a single video stream. For example, the video stream generating unit 346 synthesizes a video stream based on the video data obtained by the data obtaining unit 342, and splits the video stream into two identical video streams. In various implementations, a video stream includes a sequence of video frames. To that end, in various implementations, the video stream generating unit 346 includes instructions and/or logic therefor, and heuristics and metadata therefor.

In some implementations, the video stream shifting unit 348 temporally shifts the second video stream relative to the first video stream so that a majority of refresh times (e.g., all the refresh times) of the first display 312a are different from refresh times of the second display 312b. In some implementations, temporally shifting the second video stream causes corresponding frames in the first and second video streams to partially overlap for a non-trivial amount of time (e.g., a predetermined amount of time). For example, a particular frame is displayed by the first display 312a and, a fraction of a time step later (e.g., half a time step later), the same frame is displayed by the second display 312b. In some implementations, temporally shifting the second video stream causes the AR/VR presenting unit 344 to alternate the rendering (e.g., presentation) of frames between the first and second displays 312a and 312b. In some implementations, alternating the rendering of frames between the first and second displays 312a and 312b allows the HMD 300 to produce a psycho-optic effect resulting in a perceived frame rate that is higher than an actual frame rate of the first and second displays 312a and 312b. In some implementations, temporally shifting the second video stream relative to the first video stream allows the HMD 300 to maintain a relatively low frame rate for the first and second displays 312a and 312b while displaying frames for applications that are better suited for displays with higher frame rates. In various implementations, temporally shifting the second video stream relative to the first video stream allows the HMD 300 to conserve power and/or reduce the amount of heat generated by the HMD 300.

In some implementations, the data transmitting unit 350 transmits data (e.g., presentation data, location data, etc.) to at least one of the controller 110 and the calibration device. To that end, in various implementations, the data transmitting unit 350 includes instructions and/or logic therefor, and heuristics and metadata therefor.

Although the data obtaining unit 342, the AR/VR presenting unit 344, the video stream generating unit 346, the video stream shifting unit 348, and the data transmitting unit 350 are shown as residing on a single device (e.g., the HMD 300), it should be understood that in some implementations, any combination of the data obtaining unit 342, the AR/VR presenting unit 344, the video stream generating unit 346, the video stream shifting unit 348, and the data transmitting unit 350 may be located in separate computing devices.

Moreover, FIG. 3 is intended more as a functional description of the various features which are present in some implementations rather than a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
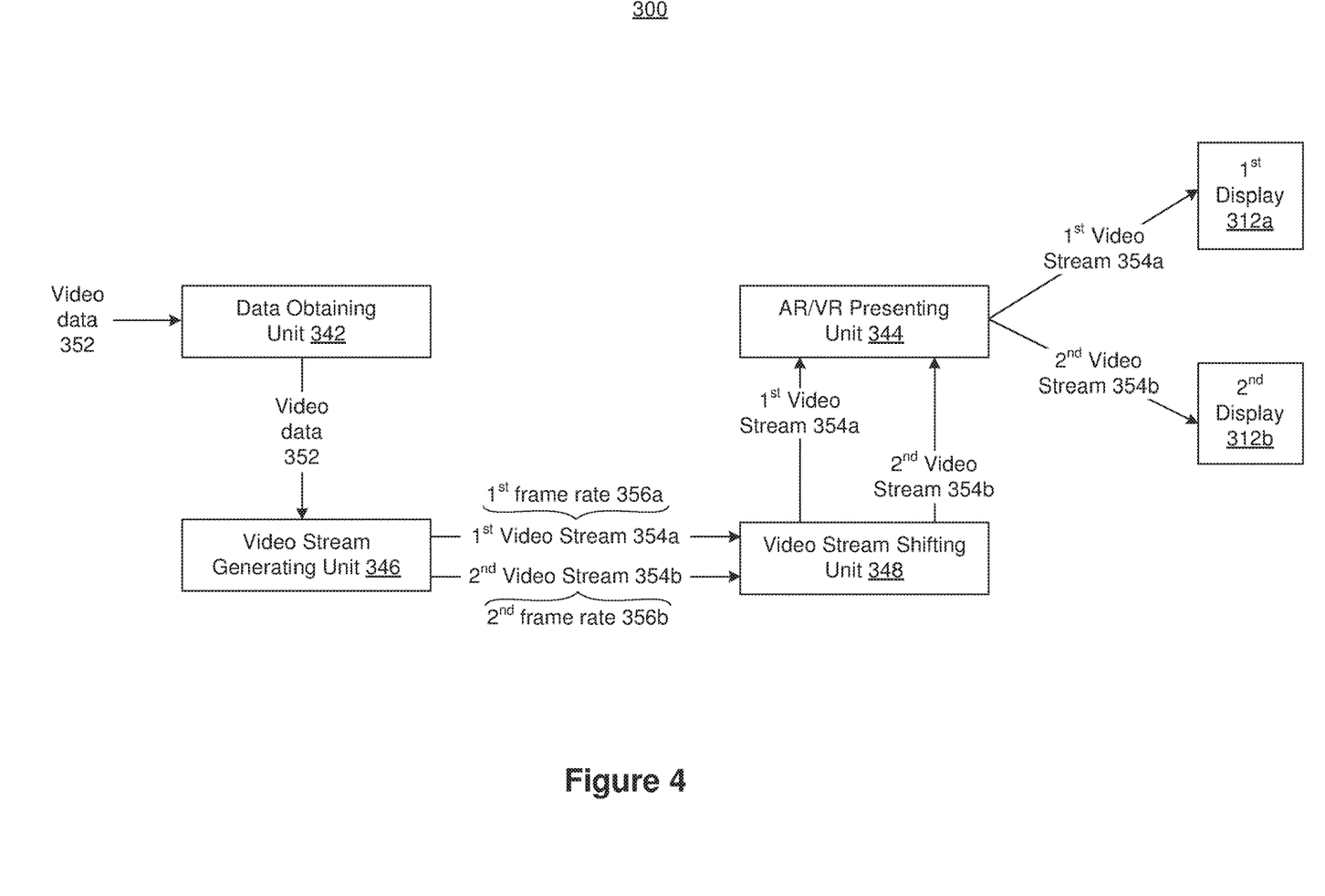
FIG. 4 is another block diagram of the HMD in accordance with some implementations.

FIG. 4 is a block diagram of the HMD 300 in accordance with some implementations. In various implementations, the data obtaining unit 342 obtains video data 352. In some implementations, the data obtaining unit 342 receives the video data 352 from the controller 200. In some implementations, the video data 352 is stored in the memory 320 of the HMD 300, and the data obtaining unit 342 retrieves the video data 352 from the memory 320. In some implementations, the video data 352 is captured by the image sensor 314, and the data obtaining unit 342 receives the video data 352 from the image sensor 314. For example, in some implementations, the video data 352 corresponds to a video of the scene 105. In some implementations, the data obtaining unit 342 obtains the video data 352 from a device that is in electronic communication with the HMD 300. For example, the data obtaining unit 342 receives the video data 352 from a smartphone that is in electronic communication with the HMD 300. In some implementations, the data obtaining unit 342 obtains the video data 342 from a remote data storage system (e.g., from cloud storage). In some implementations, the video data 352 includes video frames.

In various implementations, the video stream generating unit 346 generates a first video stream 354a and a second video stream 354b based on the video data 352. In some implementations, the video stream generating unit 346 generates a single video stream, and splits the video stream into the first video stream 354a and the second video stream 354b. As such, in some implementations, the first video stream 354a and the second video stream 354b are identical. A person of ordinary skill in the art will appreciate that the video stream generating unit 346 utilizes a variety of methods to generate the first and second video streams 354a and 354b. For example, in some implementations, the video data 352 is encoded. As such, in some implementations, the video stream generating unit 346 includes a decoder that decodes the video data 352 to generate the first and second video streams 354a and 354b. In some implementations, the video data 352 is encrypted. In such implementations, the video stream generating unit 346 decrypts the video data 352 to generate the first and second video streams 354a and 354b.

In some implementations, the video stream generating unit 346 generates the first video stream 354a at a first frame rate 356a for the first display 312a. In some implementations, the first frame rate 356a indicates a rate at which frames are presented by the first display 312a. In some implementations, the video stream generating unit 346 generates the second video stream 354b at a second frame rate 356b for the second display 312b. In some implementations, the second frame rate 356b indicates a rate at which frames are presented by the second display 312b. In some implementations, the first frame rate 356a and the second frame rate 356b are identical. In some implementations, the second frame rate 356b is within a tolerable threshold relative to the first frame rate 356a. For example, the second frame rate 356b is within 1%, 2%, 5%, or the like of the first frame rate 356a.

In various implementations, the video stream shifting unit 348 temporally shifts the second video stream 354b relative to the first video stream 354a so that a majority of refresh times (e.g., all the refresh times) of the first display 312a are different from refresh times of the second display 312b. In some implementations, the video stream shifting unit 348 shifts the second video stream 354b by a fraction of a time step relative to the first video stream 354a. For example, in some implementations, the video stream shifting unit 348 shifts the second video stream 354b by half a time step relative to the first video stream 354a. In some implementations, temporally shifting the second video stream 354b causes corresponding frames in the first and second video streams 354a and 354b to partially overlap. For example, a particular frame is displayed by the first display 312a and, a fraction of a time step later, the same frame is displayed by the second display 312b.

In various implementations, the AR/VR presenting unit 344 presents (e.g., renders) the first video stream 354a on the first display 312a and the second video stream 354b on the second display 312b. Since the first and second video streams 354a and 354b are shifted relative to each other, presenting the first and second video streams 354a and 354b amounts to alternating the presenting of corresponding frames in the first and second video streams 354a and 354b between the first and second displays 312a and 312b, respectively. For example, the AR/VR presenting unit 344 renders a first frame on the first display 312a and, a fraction of a time step later, the AR/VR presenting unit 344 renders the first frame on the second display 312b. During the next time step, the AR/VR presenting unit 344 renders a second frame on the first display 312a and, a fraction of a time step later, the AR/VR presenting unit 344 renders the second frame on the second display 312b. As such, the AR/VR presenting unit 344 alternates rendering frames between the first and second displays 312a and 312b.

Figure 5:
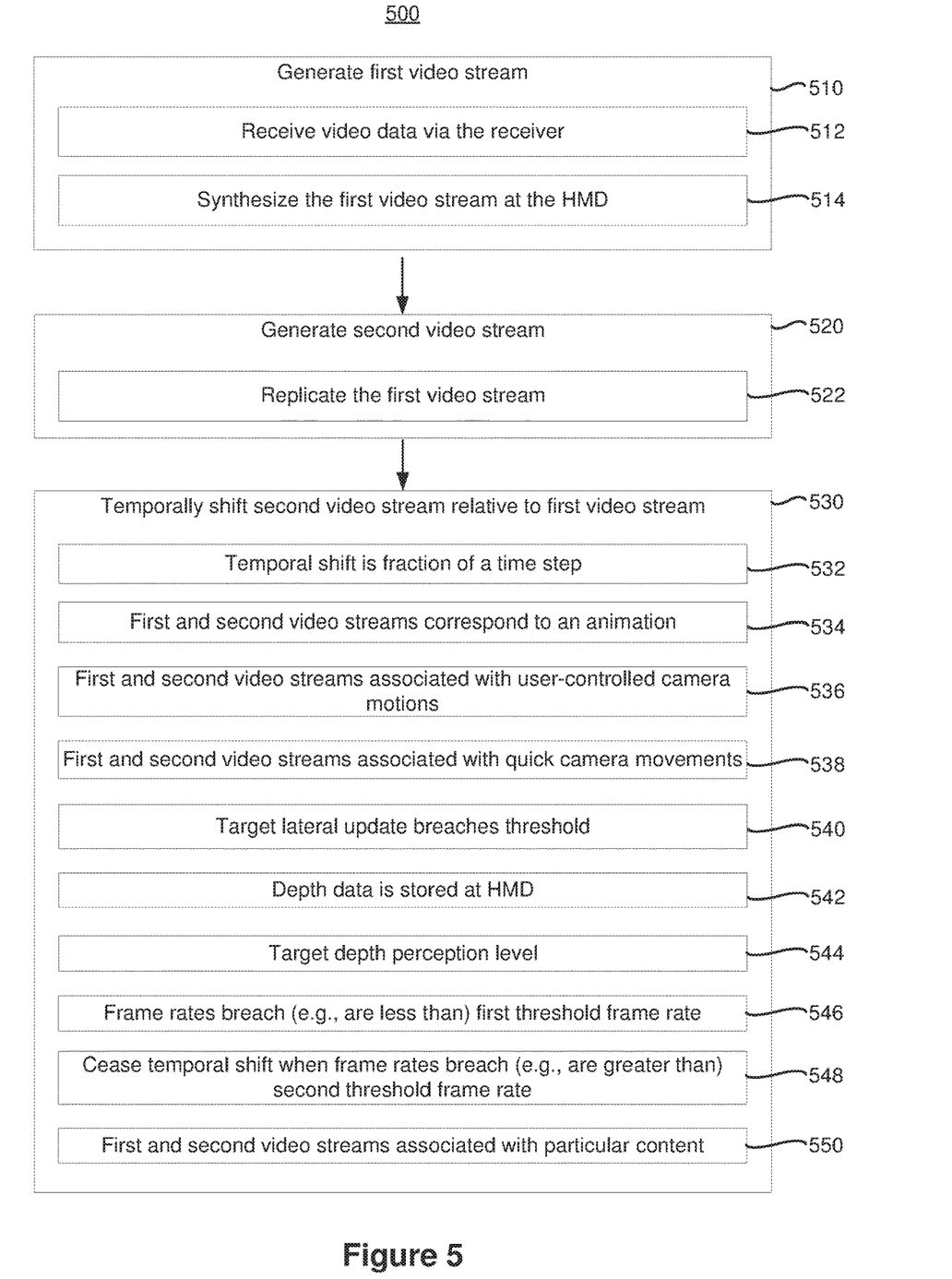
FIG. 5 is a flowchart representation of a method of presenting a video stream at the HMD in accordance with some implementations.

FIG. 5 is a flowchart representation of a method 500 of presenting video streams at an HMD in accordance with some implementations. In various implementations, the method 500 is performed by an HMD with a first display portion (e.g., a first display portion of a display, or a first display), a second display portion (e.g., a second display portion of the display, or a second display), a receiver, a non-transitory memory and one or more processors (e.g., the HMD 300 shown in FIGS. 1, 3 and 4). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, in some implementations, the method 500 includes generating a first video stream at a first frame rate for the first display portion, generating a second video stream at a second frame rate for the second display portion, and temporally shifting the second video stream relative to the first video stream so that a majority of refresh times of the first display portion are different from refresh times of the second display portion.

As represented by block 510, in various implementations, the method 500 includes generating a first video stream at a first frame rate for the first display portion (e.g., generating the first video stream 354a at the first frame rate 356a for the first display 312a shown in FIG. 4). In some implementations, the first frame rate indicates a rate at which frames are presented by the first display portion. In some implementations, the method 500 includes obtaining video data (e.g., the video data 352 shown in FIG. 4). For example, as represented by block 512, in some implementations, the method 500 includes receiving video data via the receiver. As represented by block 514, in some implementations, the method 500 includes synthesizing the first video stream at the HMD. For example, in some implementations, the method 500 includes synthesizing the first video stream based on the video data obtained by the HMD. In some implementations, the method 500 includes decoding the video data to generate the first video stream. In some implementations, the method 500 includes decrypting the video data to generate the first video stream.

As represented by block 520, in various implementations, the method 500 includes generating a second video stream at a second frame rate for the second display portion (e.g., generating the second video stream 354b at the second frame rate 356b for the second display 312b shown in FIG. 4). In some implementations, the second frame rate indicates a rate at which frames are presented by the second display portion. In some implementations, the second frame rate is within a threshold relative to the first frame rate. As represented by block 522, in some implementations, the method 500 includes replicating (e.g., copying) the first video stream to generate the second video stream. As such, in some implementations, the second frame rate is identical to the first frame rate, or within a tolerable threshold of the first frame rate. In some implementations, the method 500 includes generating a single video stream and splitting the video stream into the first and second video streams.

As represented by block 530, in various implementations, the method 500 includes temporally shifting the second video stream relative to the first video stream so that a majority of refresh times of the first display portion are different from refresh times of the second display portion. In various implementations, temporally shifting the second video stream relative to the first video stream enhances the operability of the HMD, for example, by allowing the HMD to maintain a relatively low refresh rate while presenting content that is more suitable for devices with higher refresh rates thereby reducing power consumption and/or hear generation.

As represented by block 532, in some implementations, the method 500 includes temporally shifting the second video stream by a fraction of a time step (e.g., quarter of a time step, half of a time step, three-fourths of a time step, etc.) relative to the first video stream. In various implementations, temporally shifting the second video stream by a fraction of a time step enhances the operability of the HMD, for example, by allowing the HMD to maintain a relatively low refresh rate while presenting content that is more suitable for devices with higher refresh rates. As described herein, in various implementations, maintaining a relatively low refresh rate allows the HMD to limit its power consumption and/or heat generation.

As represented by block 534, in some implementations, the method 500 includes determining whether or not the first and second video streams correspond to an animation, and temporally shifting the second video stream in response to determining that the first and second video streams correspond to an animation. In some implementations, the method 500 includes determining whether or not the first and second video streams include video frames that capture a moving object that is moving faster than a predefined speed. In some implementations, temporally shifting the second video stream improves the presentation of the animation, for example, by making the animation appear smoother. In various implementations, temporally shifting the second video stream when the first and second video streams correspond to an animation enhances the operability of the HMD, for example, by maintaining a relatively low frame rate while presenting animations that are more suitable for devices with higher frame rates thereby reducing power consumption and/or heat generation.

As represented by block 536, in some implementations, the method 500 includes determining whether or not the first and second video streams correspond to user-controlled camera motions, and temporally shifting the second video stream in response to determining that the first and second video streams correspond to user-controlled camera motions. In some implementations, the method 500 includes determining whether or not the first and second video streams include video frames that capture a field of view of a scene-facing camera of the HMD. In some implementations, the method 500 includes determining whether or not the video frames of the first and second video streams change based on a user input received via an input device (e.g., a joystick, a mouse, a keyboard, a touchpad, a touch-sensitive display, etc.). In some implementations, temporally shifting the second video stream improves the presentation of video streams that correspond to user-controlled camera motions, for example, by making the user-controller camera motions appear smoother. In various implementations, temporally shifting the second video stream when the first and second video streams correspond to user-controlled camera motions enhances the operability of the HMD, for example, by allowing the HMD to present video frames with user-controlled camera motions while maintaining a relatively low frame rate thereby reducing power consumption and/or heat generation.

As represented by block 538, in some implementations, the method 500 includes determining whether or not the first and second video streams are associated with camera movements that breach a threshold speed, and temporally shifting the second video stream in response to determining that the first and second video streams are associated with camera movements that breach the threshold speed. In some implementations, the method 500 includes determining whether the first and second video streams are associated with camera movements that are greater than the threshold speed, and temporally shifting the second video stream in response to determining that the first and second video streams are associated with camera movements that are greater than the threshold speed. In some implementations, temporally shifting the second video stream improves the presentation of video streams that correspond to quick camera movements, for example, by making the quick camera movements appear smoother. In various implementations, temporally shifting the second video stream when the first and second video streams are associated with quick camera movements enhances the operability of the HMD, for example, by allowing the HMD to present video frames associated with quick camera movements while maintaining a relatively low frame rate thereby reducing power consumption and/or heat generation.

As represented by block 540, in some implementations, the method 500 includes determining whether or not a target lateral update (e.g., a required lateral update, or a requested lateral update) is greater than a threshold lateral update rate, and temporally shifting the second video stream in response to determining that the target lateral update rate is greater than the threshold lateral update rate. In some implementations, temporally shifting the second video stream increases the lateral update rate, for example, because the refresh times of the first and second displays are different. In various implementations, temporally shifting the second video stream when the target lateral update is greater than the threshold lateral update enhances the operability of the HMD, for example, by allowing the HMD to satisfy the threshold lateral update while maintaining a relatively low frame rate thereby reducing power consumption and/or heat generation.

As represented by block 542, in some implementations, the method 500 includes determining whether or not depth data is stored at the HMD, and temporally shifting the second video stream in response to determining that the depth data is stored at the HMD. In some implementations, temporally shifting the second video stream reduces the ability of the HMD to display objects at different distances (e.g., temporally shifting the second video stream reduces depth perception at the HMD). In some implementations, the method 500 includes utilizing the depth data stored at the HMD to indicate different distances of various objects (e.g., the HMD utilizes the depth data to provide depth perception).

As represented by block 544, in some implementations, the method 500 includes determining whether or not a target depth perception level (e.g., a required depth perception level, or a requested depth perception level) is lower than a threshold depth perception level, and temporally shifting the second video stream in response to determining that the target depth perception level is lower than the threshold depth perception level. In various implementations, temporally shifting the second video stream when the target depth perception level is greater than the threshold depth perception level enhances the operability of the HMD, for example, by allowing the HMD to satisfy the threshold depth perception level while maintaining a relatively low frame rate thereby reducing power consumption and/or heat generation.

In some implementations, the method 500 includes maintaining frame rates of the first and second displays. For example, the method 500 includes maintaining the first frame rate of the first display and maintaining the second frame rate of the second display. In some implementations, the method 500 includes reducing frame rates of the first and second displays. For example, the method 500 includes reducing the first frame rate of the first display and reducing the second frame rate of the second display. In some implementations, temporally shifting the second video stream allows the HMD to maintain or reduce the frame rates of the first and second displays thereby conserving power and/or reducing the amount of heat generated by the HMD.

As represented by block 546, in some implementations, the method 500 includes determining whether or not frame rates of the first and second displays breach a first threshold frame rate, and temporally shifting the second video stream in response to determining that the frame rates of the first and second displays breach the first threshold frame rate. For example, in some implementations, the method 500 includes determining whether or not the frame rates of the first and second displays are less than the first threshold frame rate, and temporally shifting the second video stream in response to determining that the frame rates of the first and second displays are less than the first threshold frame rate. In some implementations, temporally shifting the second video stream when the frame rates are lower than the first threshold frame rate improves the display of the video streams, for example, by making the video streams appear smoother. In various implementations, temporally shifting the second video stream when the frame rates of the first and second displays are lower than the first threshold frame rate enhances the operability of the HMD, for example, by allowing the HMD to present content that is more suitable for devices with higher frame rates while maintaining a relatively low frame rate thereby reducing power consumption and/or heat generation.

As represented by block 548, in some implementations, the method 500 includes determining whether or not frame rates of the first and second frame rates breach a second threshold frame rate, and ceasing the temporal shift of the second video stream in response to determining that the first and second frame rates breach the second threshold frame rate. In some implementations, the method 500 includes determining whether or not the first and second frame rates are greater than the second threshold frame rate, and ceasing the temporal shift of the second video stream in response to determining that the first and second frame rates are greater than the second threshold frame rate. In various implementations, ceasing the temporal shift when the frame rates are greater than the second threshold frame rate enhances the operability of the HMD, for example, by reducing a number of instructions that the HMD executed thereby conserving processing power and/or reducing heat generation.

As represented by block 550, in some implementations, the method 500 includes temporally shifting the second video stream based on content associated with the first and second video streams. In some implementations, the method 500 includes determining whether or not the first and second video streams are associated with a particular type of content, and temporally shifting the second video stream in response to determining that the first and second video streams are associated with the particular type of content. For example, in some implementations, the method 500 includes determining whether or not the first and second video streams are associated with gaming, and temporally shifting the second video stream in response to determining that the first and second video streams are associated with gaming In various implementations, temporally shifting the second video stream based on content enhances the operability of the HMD, for example, by allowing the HMD to maintain a relatively low frame rate while presenting content that is more suitable for devices with higher frame rates thereby reducing power consumption and/or heat generation.

Figure 6A:
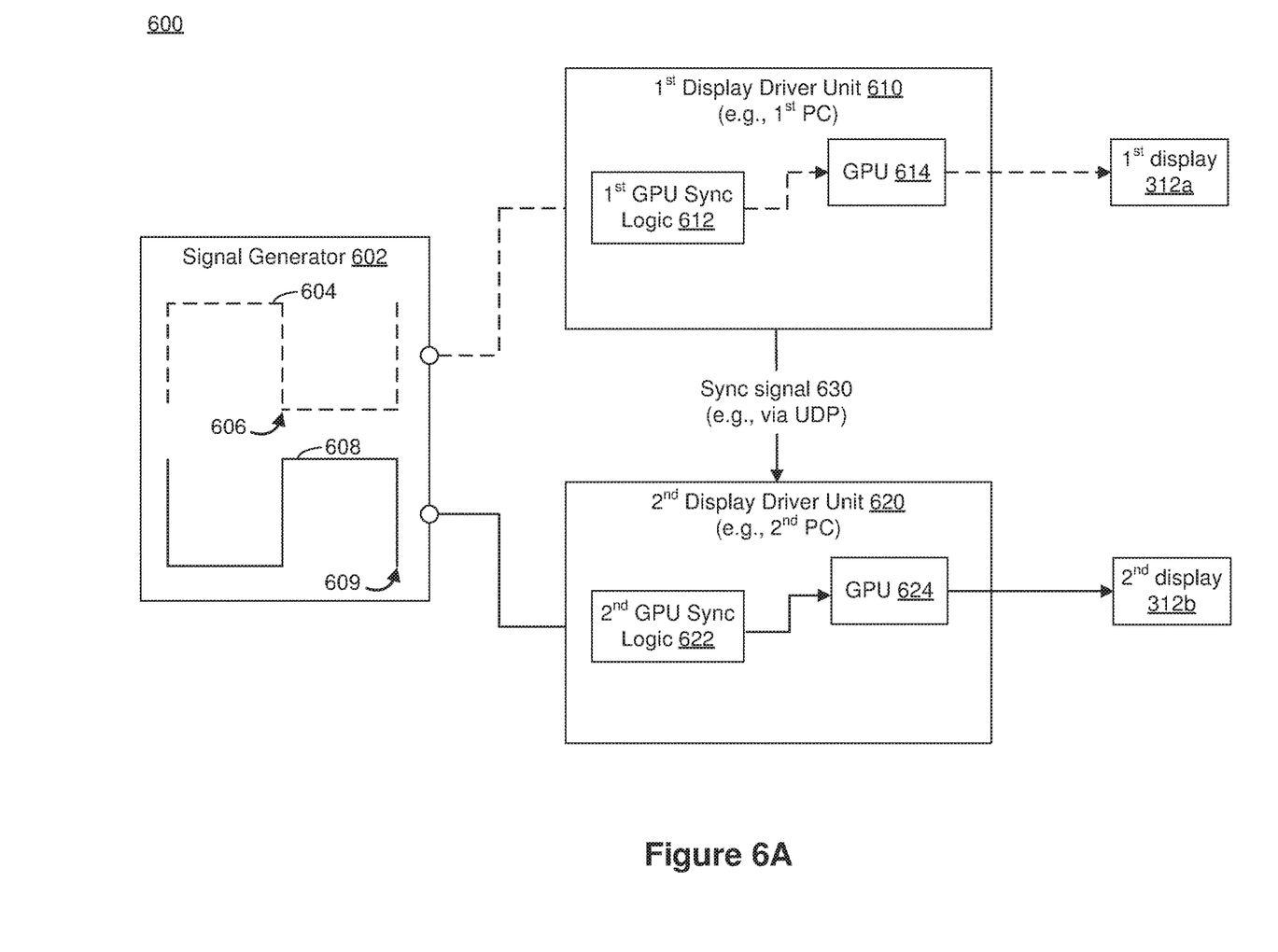
FIG. 6A is a diagram of an HMD in accordance with some implementations.

FIG. 6A is a diagram of an example HMD 600 in accordance with some implementations. In various implementations, the HMD 600 includes a signal generator 602, a first display driver unit 610 that drives the first display 312a, and a second display driver unit 620 that drives the second display 312b. In some implementations, the signal generator 602 generates a first signal and a second signal, whose time domain representations are respectively depicted at 604 and 608. In some implementations, the first signal 604 and the second signal 608 are shifted relative to each other. In the example of FIG. 6A, the first signal 604 is antiphase to the second signal 608. In some implementations, the signal generator 602 sends the first signal 604 to the first display driver unit 610, and the second signal 608 to the second display driver unit 620. In some implementations, the signal generator 602 is a TTL (transistor-transistor logic) signal generator. In such implementations, the first and second signals 604 and 608 are TTL signals.

In some implementations, the first and second display driver units 610 and 620 drive the first and second displays 312a and 312b, respectively. In some implementations, the first display driver unit 610 includes a GPU (graphics processing unit) 614 that presents video streams on the first display 312a. In some implementations, the second display driver unit 620 includes a GPU 624 that presents video streams on the second display 312b. In some implementations, the first display driver unit 610 and the second display driver unit 620 include respective GPU synchronization logics 612 and 622. In some implementations, the GPU synchronization logics 612 and 622 communicate with each other in order to maintain the temporal shift of video streams between the first and second displays 312a and 312b. For example, in some implementations, the first display driver unit 610 transmits a synchronization signal 630 to the second display driver unit 620. In such implementations, the second display driver unit 620 utilizes the synchronization signal 630 to maintain the temporal shift of video streams between the first and second displays 312a and 312b. In some implementations, the first display driver unit 610 serves as a master, and the second display driver unit 620 serves as a slave. In some implementations, the first display driver unit 610 sends the synchronization signal 630 according to UDP (User Datagram Protocol). In some implementations, the first and second display driver units 610 and 620 reside at respective personal computers.

In various implementations, the first display 312a displays a first video stream, and the second display 312b displays a second video stream. The HMD 600 temporally shifts the second video stream relative to the first video stream so that refresh times of the first and second displays 312a and 312b are different. In some implementations, the first display driver unit 610 (e.g., the GPU 614) refreshes the first display 312a at a falling edge 606 of the first signal 604. In some implementations, the second display driver 620 (e.g., the GPU 624) refreshes the second display 312b at a falling edge 609 of the second signal 608. As illustrated in the example of FIG. 6A, the falling edge 606 of the first signal 604 and the falling edge 609 of the second signal 608 are temporally shifted relative to each other. As such, the refresh times of the first and second displays 312a and 312b are different. In the example of FIG. 6A, the falling edge 609 of the second signal 608 is shifted by half a time step relative to the falling edge 606 of the first signal 604. For example, if the first display driver unit 610 triggers a refresh of the first display 312a at time t, then the second display driver unit 620 triggers a refresh of the second display 312b at time t+0.5*frametime (e.g., t+0.5*T, where T represents the signal period). More generally, in various implementations, the falling edge 609 of the second signal 608 is shifted by a fraction of the frametime (e.g., the signal period) relative to the falling edge 606 of the first signal 604.

Figure 6B:
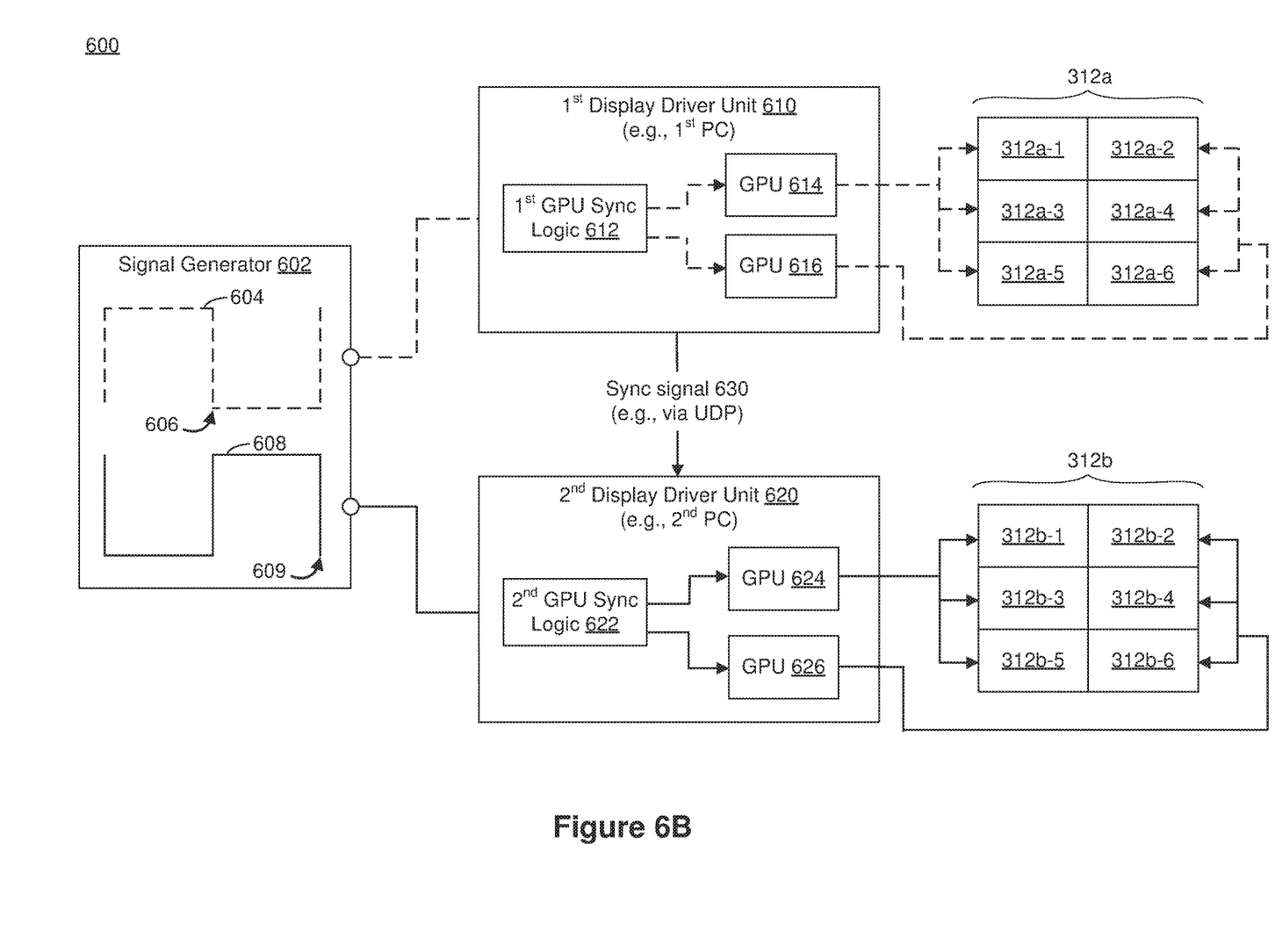
FIG. 6B is another diagram of an HMD in accordance with some implementations.

FIG. 6B is another diagram of the HMD 600 in accordance with some implementations. In the example of FIG. 6B, the first display 312a includes six displays 312a-1, 312a-2 . . . 312a-6, and the second display 312b includes six displays 312b-1, 312b-2 . . . 312b-6. In the first display driver unit 610, the GPU 614 drives three displays 312a-1, 312a-3 and 312a-5, and GPU 616 drives the other three displays 312a-2, 312a-4 and 312a-6. In the second display driver unit 620, the GPU 624 drives three displays 312b-1, 312b-3 and 312b-5, and GPU 626 drives the other three displays 312b-2, 312b-4 and 312b-6. In the example of FIG. 6B, each GPU drives three displays. A person of ordinary skill in the art will appreciate that, in some implementations, each GPU drives fewer or more displays.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a head-mountable device including a first display portion, a second display portion, a non-transitory memory, and one or more processors coupled with the first display portion, the second display portion, and the non-transitory memory:
   generating a first video stream at a first frame rate for the first display portion, wherein the first frame rate indicates a rate at which frames are presented by the first display portion;
   generating a second video stream at a second frame rate for the second display portion, wherein the second frame rate indicates a rate at which frames are presented by the second display portion and wherein the second frame rate is approximately equal to the first frame rate; and
   temporally shifting the second video stream relative to the first video stream so that refresh times of the first display portion are different from refresh times of the second display portion and presentation of frames alternates between the first display portion and the second display portion, wherein an area encompassed by the first display portion does not overlap with an area encompassed by the second display portion.

2. The method of claim 1, wherein temporally shifting the second video stream includes:
   determining whether or not the first and second video streams correspond to an animation; and
   temporally shifting the second video stream in response to determining that the first and second video streams correspond to an animation.

3. The method of claim 1, wherein temporally shifting the second video stream includes:
   determining whether or not a target lateral update rate is higher than a threshold lateral update rate; and
   temporally shifting the second video stream in response to determining that the target lateral update rate is higher than the threshold lateral update rate.

4. The method of claim 1, wherein temporally shifting the second video stream includes:
   determining whether or not a target depth perception level is lower than a threshold depth perception level; and
   temporally shifting the second video stream in response to determining that the target depth perception level is lower than the threshold depth perception level.

5. The method of claim 1, further comprising:
   in response to temporally shifting the second video stream, maintaining the first frame rate of the first display portion and the second frame rate of the second display portion.

6. The method of claim 1, further comprising:
   in response to temporally shifting the second video stream, lowering the first frame rate of the first display portion and the second frame rate of the second display portion.

7. The method of claim 1, wherein temporally shifting the second video stream includes:
   determining whether or not the first and second frame rates are lower than a first threshold frame rate; and
   temporally shifting the second video stream in response to determining that the first and second frame rates are lower than the first threshold frame rate.

8. The method of claim 7, further comprising:
   determining whether or not the first and second frame rates are higher than a second threshold frame rate; and
   ceasing the temporal shift of the second video stream so that the majority of refresh times of the first display portion are the same as refresh times of the second display portion in response to the first and second frame rates being higher than the second threshold frame rate.

9. The method of claim 1, wherein temporally shifting the second video stream includes:
   determining whether or not the first and second video streams are associated with a particular type of content; and
   temporally shifting the second video stream in response to determining that the first and second video streams are associated with the particular type of content.

10. The method of claim 1, wherein temporally shifting the second video stream includes:
    determining whether or not the first and second video streams capture user-controlled camera motions; and
    temporally shifting the second video stream in response to determining that the first and second video streams capture user-controlled camera motions.

11. The method of claim 1, wherein temporally shifting the second video stream includes:
    determining whether or not the first and second video streams are associated with camera movements that are higher than a threshold camera speed; and
    temporally shifting the second video stream in response to determining that the first and second video streams are associated with camera movements that are higher than the threshold camera speed.

12. The method of claim 1, wherein generating the second video stream comprises replicating the first video stream.

13. The method of claim 1, wherein generating the first video stream and generating the second video stream comprises splitting a single video stream.

14. The method of claim 1, wherein the second frame rate is within five percent of the first frame rate.

15. The method of claim 1, wherein the second frame rate is within one percent of the first frame rate.

16. The method of claim 1, wherein the first display portion comprises a first display for a first eye of a user and the second display portion comprises a second display for a second eye of the user.

17. A device comprising:
one or more processors;
a non-transitory memory;
a first display portion;
a second display portion; and
one or more programs stored in the non-transitory memory, which, when executed by the one or more processors, cause the device to:
generate a first video stream at a first frame rate for the first display portion, wherein the first frame rate indicates a rate at which frames are presented by the first display portion;
generate a second video stream at a second frame rate for the second display portion, wherein the second frame rate indicates a rate at which frames are presented by the second display portion, and wherein the second frame rate is approximately equal to the first frame rate; and
temporally shift the second video stream relative to the first video stream so that refresh times of the first display portion are different from refresh times of the second display portion and presentation of frames alternates between the first display portion and the second display portion, wherein an area encompassed by the first display portion does not overlap with an area encompassed by the second display portion.

18. The device of claim 17, wherein temporally shifting the second video stream includes:
determining whether or not the first and second video streams are associated with a particular type of content; and
temporally shifting the second video stream in response to determining that the first and second video streams are associated with the particular type of content.

19. The device of claim 17, wherein the first display portion comprises a first display for a first eye of a user and the second display portion comprises a second display for a second eye of the user separate from the first display.

20. A non-transitory memory storing one or more programs, which, when executed by one or more processors of a device with a first display portion and a second display portion, cause the device to:
generate a first video stream at a first frame rate for the first display portion, wherein the first frame rate indicates a rate at which frames are presented by the first display portion;
generate a second video stream at a second frame rate for the second display portion, wherein the second frame rate indicates a rate at which frames are presented by the second display portion, and wherein the second frame rate is approximately equal to the first frame rate; and
temporally shift the second video stream relative to the first video stream so that refresh times of the first display portion are different from refresh times of the second display portion and presentation of frames alternates between the first display portion and the second display portion, wherein an area encompassed by the first display portion does not overlap with an area encompassed by the second display portion.

21. A method comprising:
at a head-mountable device including a first display portion, a second display portion, a non-transitory memory, and one or more processors coupled with the first display portion, the second display portion, and the non-transitory memory:
generating a first video stream at a first frame rate for the first display portion, wherein the first frame rate indicates a rate at which frames are presented by the first display portion;
generating a second video stream at a second frame rate for the second display portion, wherein the second frame rate indicates a rate at which frames are presented by the second display portion and wherein the second frame rate is approximately equal to the first frame rate; and
temporally shifting the second video stream relative to the first video stream by a fraction of a frame period of the second frame rate.

22. The method of claim 21, wherein the second video stream is shifted relative to the first video stream by less than the frame period of the second frame rate.

23. The method of claim 21, wherein the second video stream is shifted relative to the first video stream by half the frame period of the second frame rate.

* * * * *